United States Patent Office 2,922,320
Patented Jan. 26, 1960

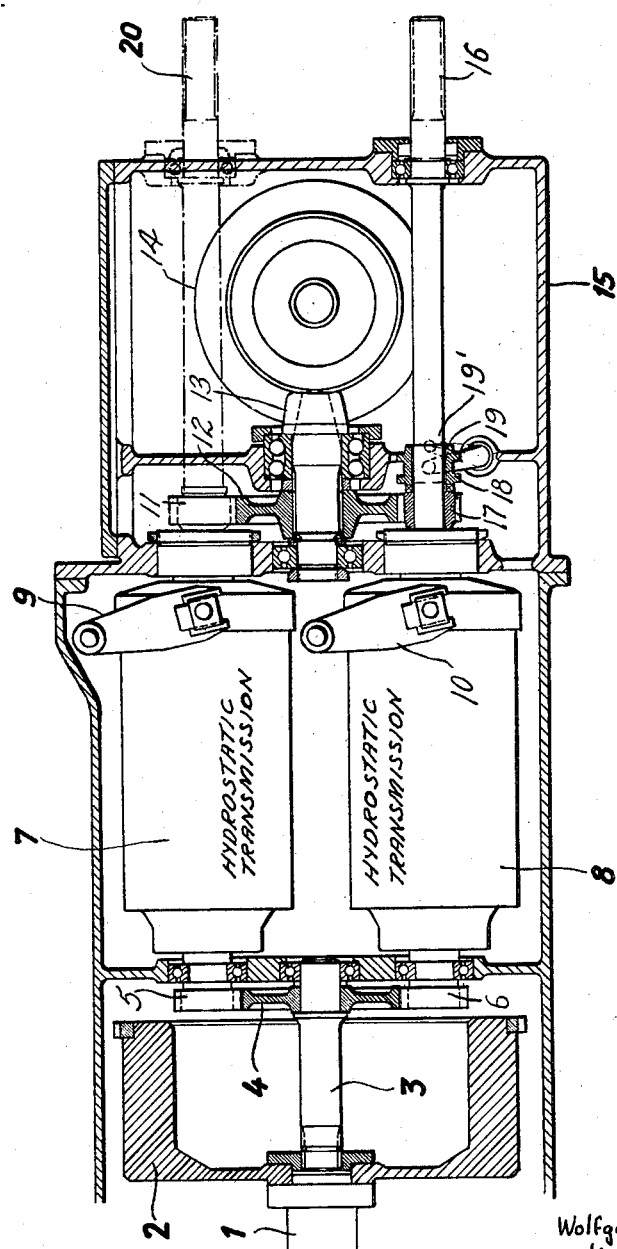

2,922,320

DRIVE ARRANGEMENT FOR VEHICLES SUCH AS TRACTORS AND THE LIKE

Wolfgang Hütter, Bezgenriet, Wurttemberg, and Kaspar Ritter, Kirchheim (Teck), Germany, assignors to Allgaier-Werke G.m.b.H., Uhingen, Wurttemberg, Germany Application May 22, 1957, Serial No. 660,802

7 Claims. (Cl. 74—720)

The present invention relates to vehicles such as tractors and the like.

With vehicles of this type it is necessary not only to provide a drive to the wheels of the vehicle so that the vehicle will transport itself, but in addition it is necessary to provide a drive to a power take-off shaft so that from such a shaft various implements may be driven or a drive may be transmitted to a trailer, for example.

One of the objects of the present invention is to provide a vehicle of this type where such a power take-off shaft may be driven either at a speed proportional to the speed of movement of the vehicle or at a speed independent of the speed of movement of the vehicle and proportional only to the speed of rotation of a drive shaft of the vehicle such as the crank shaft of the engine of the vehicle.

Another object of the present invention is to provide an arrangement where the drives to an axle of the vehicle and the power take-off shaft are separately adjustable and where any desired combination of drives may be transmitted to the power take-off shaft.

A further object of the present invention is to provide an exceedingly simple and rugged structure capable of accomplishing the above objects which is very reliable in operation.

With the above objects in view the present invention mainly consists of a vehicle such as a tractor or the like, this vehicle including a drive means and a pair of hydrostaic transmissions such as a pair of fluid drives opeartively connected to the drive means to be driven thereby. A transmission means interconnects one of the fluid drives with an axle of the vehicle for driving this axle, and a power take-off shaft is connected operatively with the other of the fluid drives to be driven thereby. A means is provided for optionally connecting the power take-off shaft with the transmission means transmitting the drive to the axle so that the power take-off shaft may be driven at least in part by the fluid drive connected by the transmission means to the axle or the power take-off shaft may be driven solely by the fluid drive to which it is connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows a plan view partly in section of the device.

Referring to the drawing, a drive means in the form of a crank shaft of the vehicle is shown at the left of the drawing, this crank shaft 1 rotating about its own axis and forming part of any suitable engine or the like. A flywheel 2 is fixed to the drive shaft 1 for rotation therewith, and a shaft 3 is coaxial with and forms an extension of the drive shaft 1, this shaft 3 being fixed through the flywheel 2 to the shaft 1 for rotation therewith. The shaft 3 has fixedly connected thereto a gear 4 which rotates together with the shaft 3, and this gear 4 meshes on the one hand with a gear 5 and on the other hand with a gear 6. The gear 5 is operatively connected to a hydrostaitc transmission in the form of a fluid drive 7, while the gear 6 is operatively connected to another hydrostatic transmission in the form of a fluid drive 8. All of the parts are suitably supported in bearings carried by a suitable housing or frame so that all of the parts may rotate properly and are properly supported on the vehicle. The fluid drives 7 and 8 are of a conventional construction and are steplessly adjustable from a neutral position where they will transmit no drive to any desired position where a given transmission ratio is obtained. The manually operable means 9 for adjusting the fluid drive 7 is diagrammatically shown in the drawing, and the same is true of the manually operable adjusting means 10. Both of these adjusting means are connected through suitable linkages to a cab of the vehicle, for example, so that the opertor may provide any desired setting of the fluid drives 7 and 8.

A housing 15 has a gear 11 located in its interior, and this gear 11 is connected to the fluid drive 7 so as to be rotated by the latter. The gear 11 meshes with another gear 12 which is fixed on a shaft which carries a bevel pinion 13, this shaft being supported for rotation about its axis by a suitable ball bearing carried by the left wall of the housing 15, as viewed in the drawing. The bevel pinion 13 meshes with a bevel gear 14 which is connected to an axle of the vehicle, this axle being connected to a pair of wheels of the vehicle, so that the parts 11–14 form a transmission means for transmitting a drive from the fluid drive 7 to an axle of the vehicle for driving the vehicle.

The housing 15 also has a power take-off shaft 16 extending into its interior and supported for rotation therein by a sutiable ball bearing carried by the right wall of the housing 15, as viewed in the drawing, and the right free end of the power shaft 16 is provided with suitable splines so that this power take-off shaft 16 may be connected to any suitable device which is to be driven thereby. The power take-off shaft 16 is connected to the fluid drive 8 so as to be driven by the latter.

A suitable means is provided for optionally connecting the power take-off shaft 16 with the transmission means 11–14, so that this power take-off shaft 16 may be driven at a speed proportional to the speed of movement of the vehicle. This means takes the form of a gear 17 which is freely turnable on the shaft 16 and meshes with the gear 12. The right end of the gear 17 is provided with a plurality of clutch teeth which are spaced about the axis of the shaft 16. A clutch member 18 is axially shiftable along the shaft 16 and has at its left end a plurality of clutch teeth which are adapted to mesh with the clutch teeth of the gear 17 so as to provide a driving engagement between the shaft 16 and the gear 17. The shiftable clutch member 18 may be splined or connected by a key and keyway to the shaft 16 so that the clutch member 18 is shiftable axially along the shaft 16 but is not capable of rotating with respect to the latter. A manually operable shifting fork or the like 19 cooperates with the shiftable clutch member 18 for shifting the latter into or out of engagement with the gear 17, and when the shifting fork 19 has the left position shown in solid lines in the drawing, the clutch is engaged, while when the shifting fork 19 has the broken line position indicated at 19', the clutch is disengaged.

In the disengaged position of the clutch the power take-off shaft 16 will be driven solely by the fluid drive 8, and as a result the speed of rotation of the power take-off shaft 16 will be completely independent of the speed of movement of the vehicle and will only be proportional to the speed of rotation of the drive shaft 1. Because of the fact that the fluid drive 8 permits a clutch between the drive shaft 1 and the shaft 16 to be omitted inasmuch as the fluid drive 8 has a neutral position where no drive is transmitted to the shaft 16, it is possible to positively rotate the shaft 16 at any desired speed having any desired proportion to the speed of rotation of the shaft 1, and it is possible to start the rotation of the shaft 16 while it is under load, which is particularly suitable in the case of a tractor which drives through the shaft 16 such machines as harvester threshers, choppers, or the like.

On the other hand, when the clutch is engaged the shaft 16 will rotate at a speed which is proportional to the speed of movement of the vehicle, and then the power take-off shaft 16 may be used for driving any devices whose speed of operation should be proportional to the speed of movement of the vehicle. For example, a drive may extend from the shaft 16 to an axle of a trailer which should have its axle rotated at a speed proportional to the speed of movement of the vehicle carrying the structure shown in the drawing.

When the clutch is engaged the torque converter or fluid drive 8 may be placed in its neutral position so that the entire driving power is derived from the torque converter or fluid drive 7. However, this would require an extremely large fluid drive 7 to be provided, and it is therefore preferred to set both of the adjustments 9 and 10 when the clutch is engaged so that the shaft 16 is driven in part by the fluid drive 7 and in part by the fluid drive 8. It is possible by properly operating the fluid drive adjustments 9 and 10 to derive from the pair of torque converters 7 and 8 a pair of synchronous drives which drive both the axle of the vehicle and the shaft 16 at a speed proportional to the movement of the vehicle, and in this way the output of the engine is distributed to the axle and the shaft 16 through both of the torque converters 7 and 8. In this way the size of the torque converter 7 may be less than that which would be required if all of the power for both the transportation of the vehicle and the power shaft 16 were derived only from the fluid drive 7. This is of particular advantage with respect to large heavy-duty tractors where an extremely large torque converter 7 would be required.

In order to be able to obtain at any time an additional drive which has any desired proportion to the speed of movement of the vehicle, an additional power take-off shaft 20 may be provided which is similar and parallel to the shaft 16 and which is fixedly connected with the gear 11 so as to be driven directly from the torque converter 7. The shaft 20 is shown in dot-dash lines in the drawing and is rotatably supported by a suitable ball bearing or the like carried by the right wall of the housing 15, as is shown in the drawing.

It will be understood that each of the elements described above, or two or more together, may also find a useful application in other types of vehicles differing from the types described above.

While the invention has been illustrated and described as embodied in vehicles such as tractors and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle such as a tractor or the like, in combination, a pair of hydrostatic transmission means; axle drive means interconnecting one of said hydrostatic transmission means with an axle of the vehicle for transmitting a drive from said one transmission means to the vehicle axle; power take-off shaft means operatively connected to the other of said hydrostatic transmission means to be driven by the latter; and means for optionally interconnecting said power take-off shaft means with said one hydrostatic transmission means, while said power take-off shaft means remain connected to said other of said hydrostatic means so that said power take-off shaft means may be optionally driven at least in part by said one hydrostatic transmission means.

2. In a vehicle such as a tractor or the like, in combination, a drive shaft; a pair of fluid drives operatively connected to said drive shaft to be driven thereby; transmission means interconnecting one of said fluid drives with an axle of the vehicle for driving said axle from said one fluid drive; a power take-off shaft operatively connected to the other of said fluid drives to be driven thereby; and means for optionally connecting said power take-off shaft with said transmission means while said take-off shaft means remain connected to said other fluid drive for optionally driving said power take-off shaft at least in part from said one fluid drive, whereby said power take-off shaft may either be driven at a speed proportional to the speed of said drive shaft and independent of the speed of movement of the vehicle when said power take-off shaft is not connected to said transmission means or said power take-off shaft may be driven at speeds proportional to the speed of movement of the vehicle when it is connected to said transmission means.

3. In a vehicle such as a tractor or the like, in combination, drive means; a pair of fluid drives respectively connected operatively with said drive means to be driven thereby; transmission means interconnecting one of said fluid drives with an axle of the vehicle for transmitting a drive from said one fluid drive to said axle, said transmission means including at least one gear; a power take-off shaft connected operatively to the other of said fluid drives to be driven by the latter; a second gear freely turnable on said power take-off shaft and meshing with said gear of said transmission means; and clutch means for optionally placing said power take-off shaft in driving engagement with said gear which is freely turnable thereon while said take-off shaft means remain connected to said other fluid drive.

4. In a vehicle such as a tractor or the like, in combination, drive means; a pair of separately adjustable fluid drives connected operatively with said drive means to be driven thereby, each of said fluid drives being adjustable from a neutral position where no drive is transmitted therethrough to any desired position where a given transmission ratio is obtained; transmission means interconnecting one of said fluid drives with an axle of the vehicle for driving said axle from said one fluid drive, said transmission means including a first gear; a power take-off shaft connected operatively and permanently to the other of said fluid drives to be driven thereby; a second gear freely turnable on said power take-off shaft and meshing with said first gear; and manually operable clutch means cooperating with said power take-off shaft and second gear for optionally placing said power take-off shaft into or out of driving engagement with said second gear while said take-off shaft means remain connected to said other fluid drive, whereby when said clutch means is set to place said power take-off shaft out of driving engagement with said second gear said power take-off shaft may be driven solely by said other fluid drive means at a predetermined speed proportional to the speed of rotation of said drive means or by placing said power take-off shaft in driving engagement with said second gear said power take-off shaft may be driven either independently by said one fluid drive together with said axle at a speed proportional to the movement of the vehicle or said power take-off shaft may in the latter case be driven from both of said fluid drives.

5. In a vehicle such as a tractor or the like, in combination, drive means; a pair of fluid drives operatively connected to said drive means to be driven thereby; transmission means interconnecting one of said fluid drives with an axle of the vehicle for driving said axle from said one fluid drive, said transmission means including a first gear; a power take-off shaft operatively connected to the other of said fluid drives to be driven thereby, whereby said power take-off shaft may be independently driven by said other fluid drive; a second gear freely turnable on said power take-off shaft and meshing with said first gear, said second gear having at one of its sides a plurality of teeth forming one part of a clutch; a second clutch part axially shiftable on said power take-off shaft, constrained to rotate therewith, and having a plurality of teeth adapted to be located respectively between said teeth of said second gear when said clutch is shifted to a position for placing said power take-off shaft in driving engagement with said second gear while said take-off shaft means remain connected to said other fluid drive, whereby said power take-off shaft may be also driven at least in part from said one fluid drive.

6. In a vehicle such as a tractor or the like, in combination, drive means; a pair of fluid drives operatively connected to said drive means to be driven thereby; a pair of power take-off shafts respectively connected operatively to said pair of fluid drives to be driven thereby; transmission means interconnecting one of said fluid drives with an axle of the vehicle for driving said axle from said one fluid drive; and means for optionally placing one of said power take-off shafts in driving engagement with said transmission so that said one power take-off shaft may be optionally driven at least in part from said one fluid drive, the other of said power take-off shafts being driven exclusively by said one fluid drive.

7. In a vehicle such as a tractor or the like, in combination, a prime mover; a pair of hydrostatic transmission means operatively connected to said prime mover to be driven thereby; axle drive means interconnecting one of said hydrostatic transmission means with an axle of the vehicle for transmitting a drive from said one transmission means to said vehicle axis; a power take-off shaft means having a free end and being operatively connected at the other end thereof to the other of said hydrostatic transmission means to be driven by the latter; and means for optionally connecting said power take-off shaft means with said axle drive means, so that said axle drive means and said power take-off shaft means may be optionally driven independently from each other by said hydrostatic transmission means, respectively, or together by both of said hydrostatic transmission means.

References Cited in the file of this patent
UNITED STATES PATENTS

| | | |
|---|---|---|
| 1,156,766 | Evans | Oct. 12, 1915 |
| 2,106,843 | Hahn | Feb. 1, 1938 |
| 2,717,523 | Lammerz | Sept. 13, 1955 |